Figure 1:
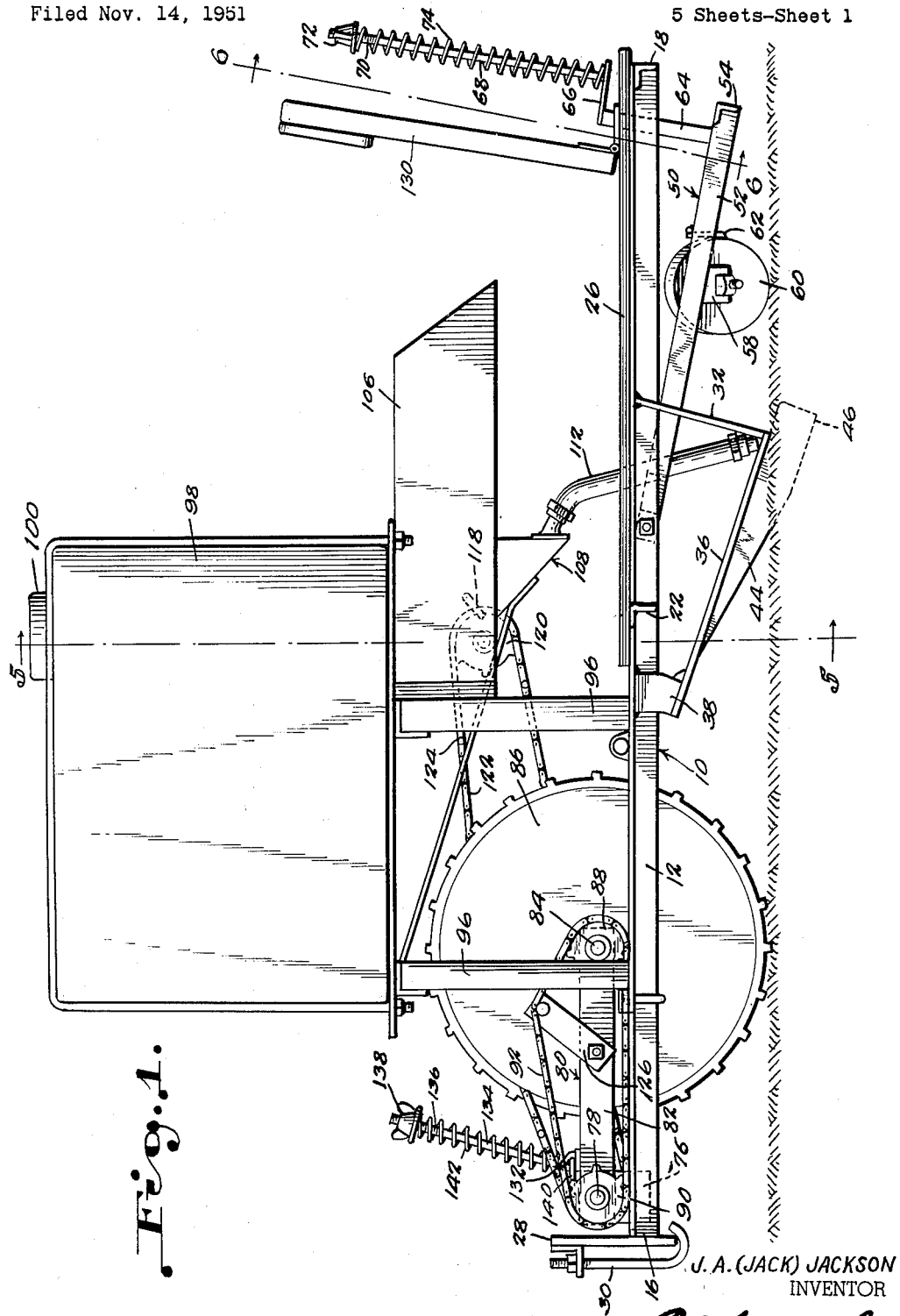

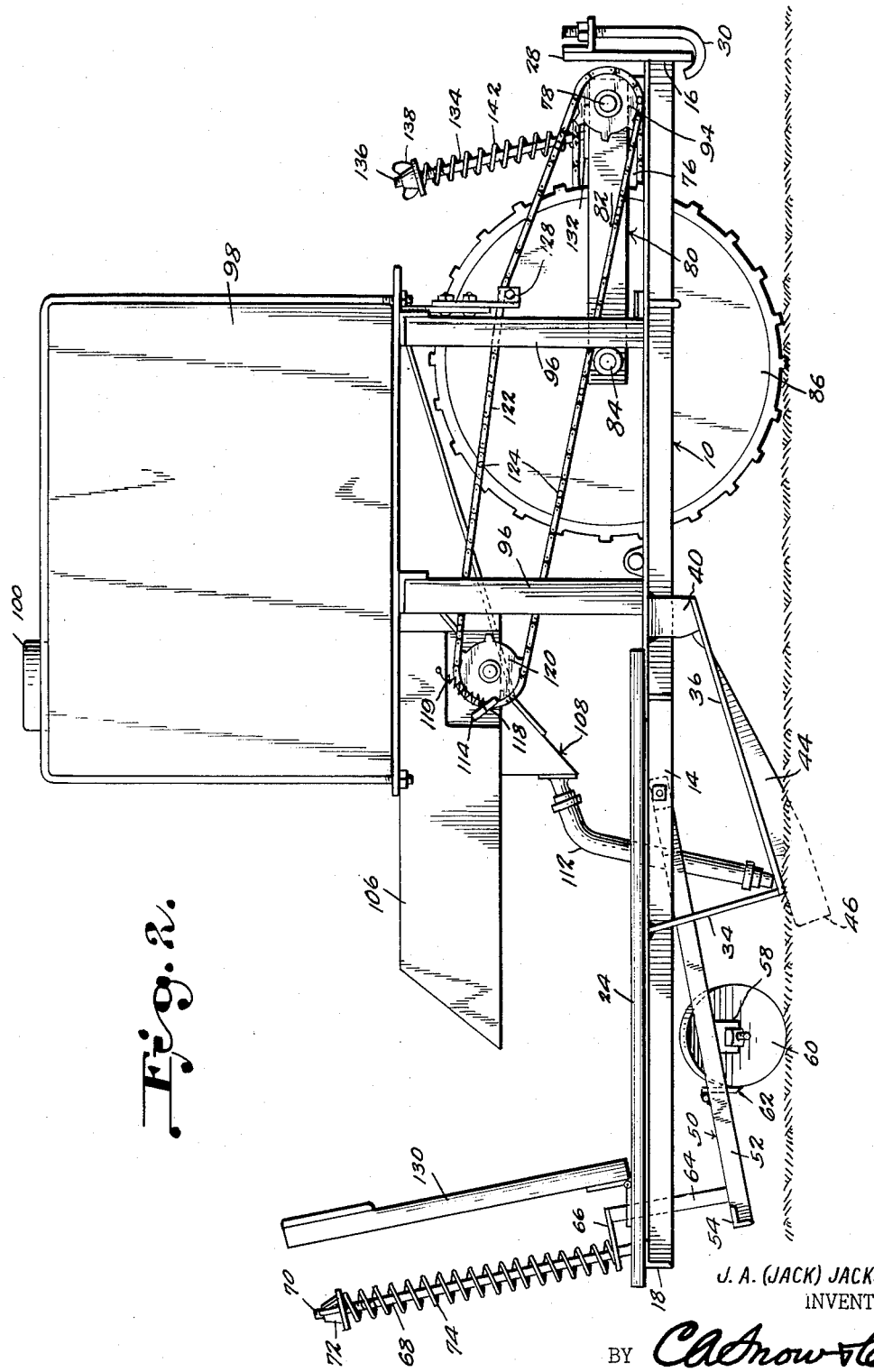

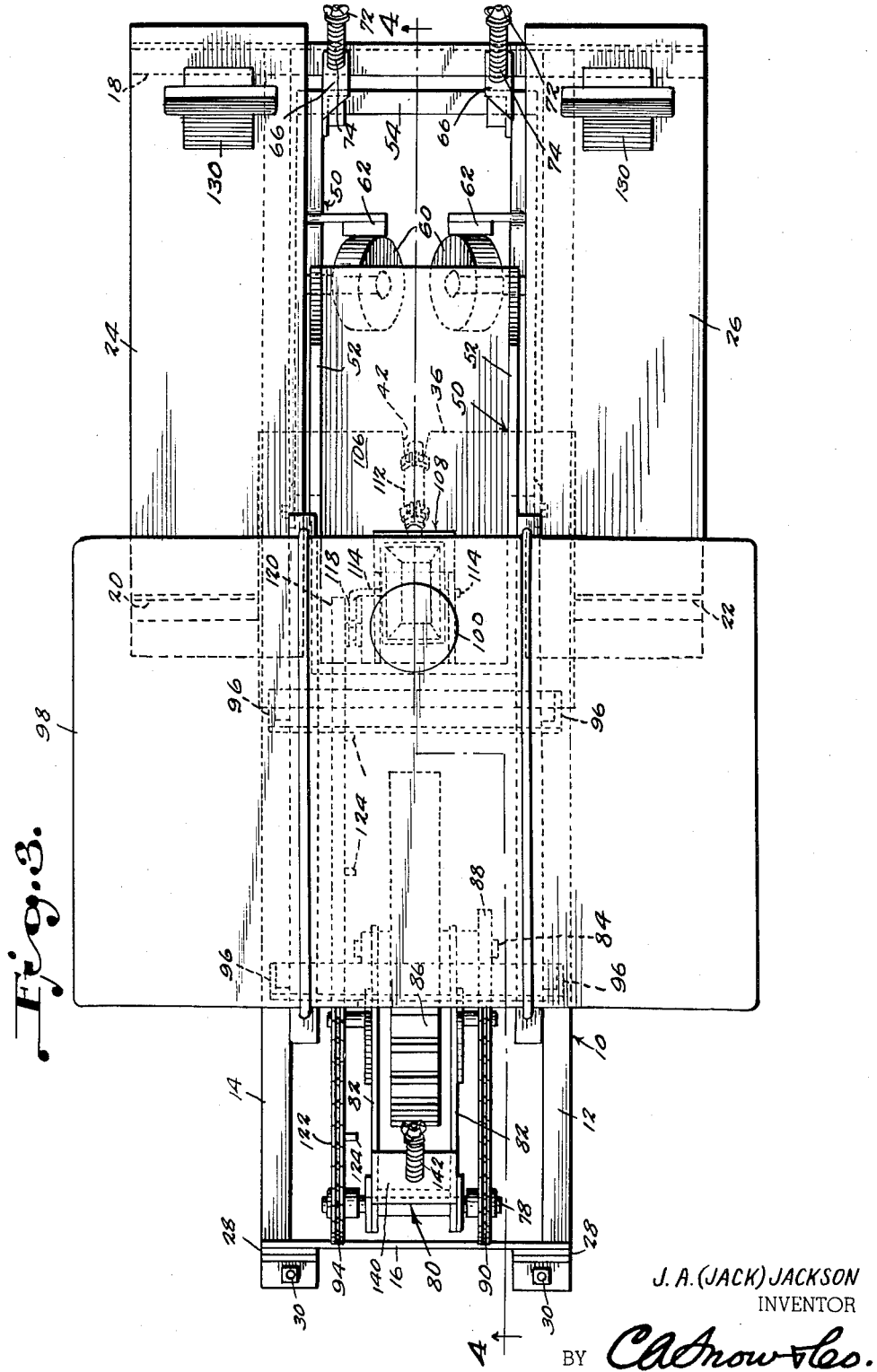

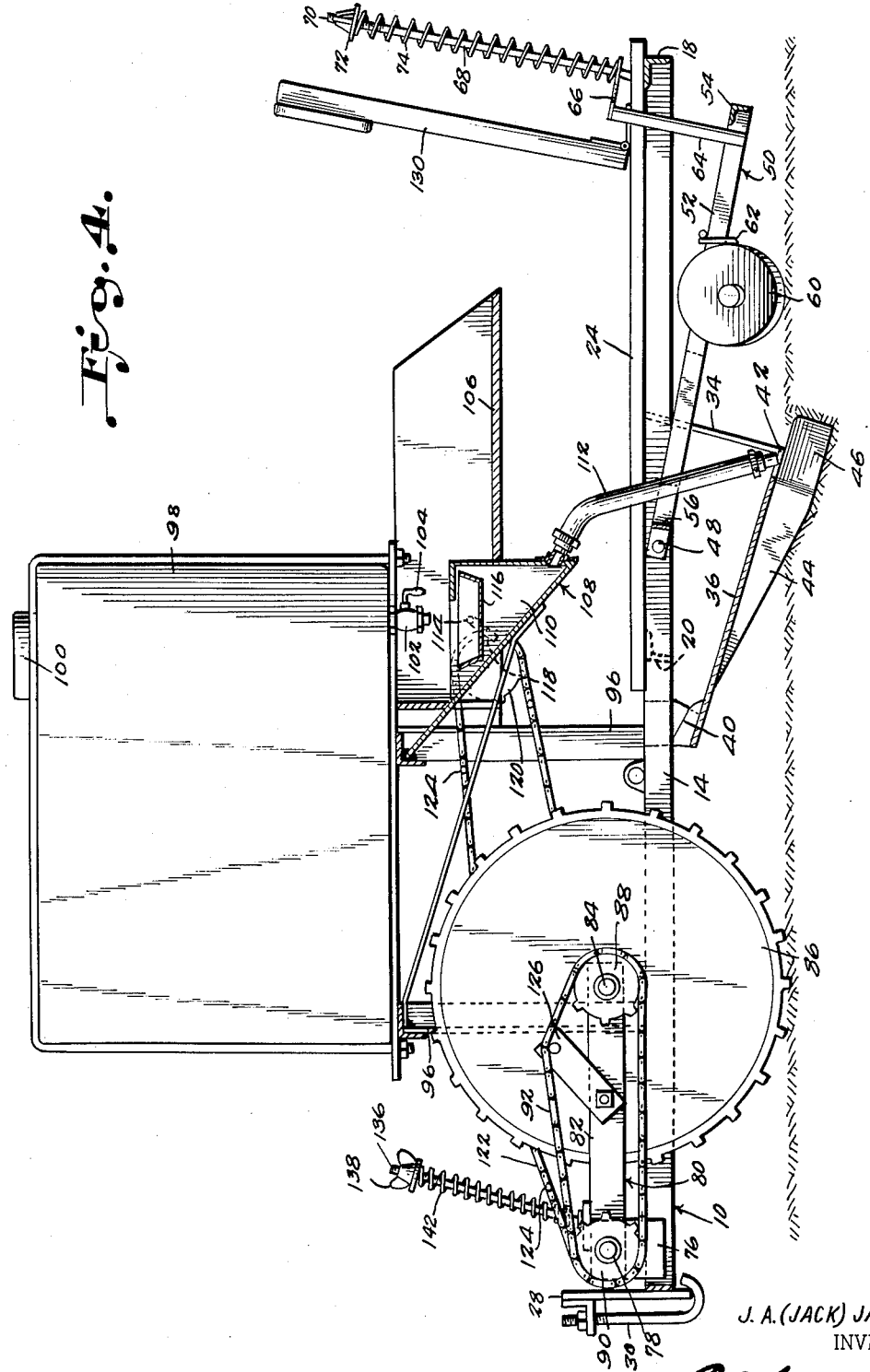

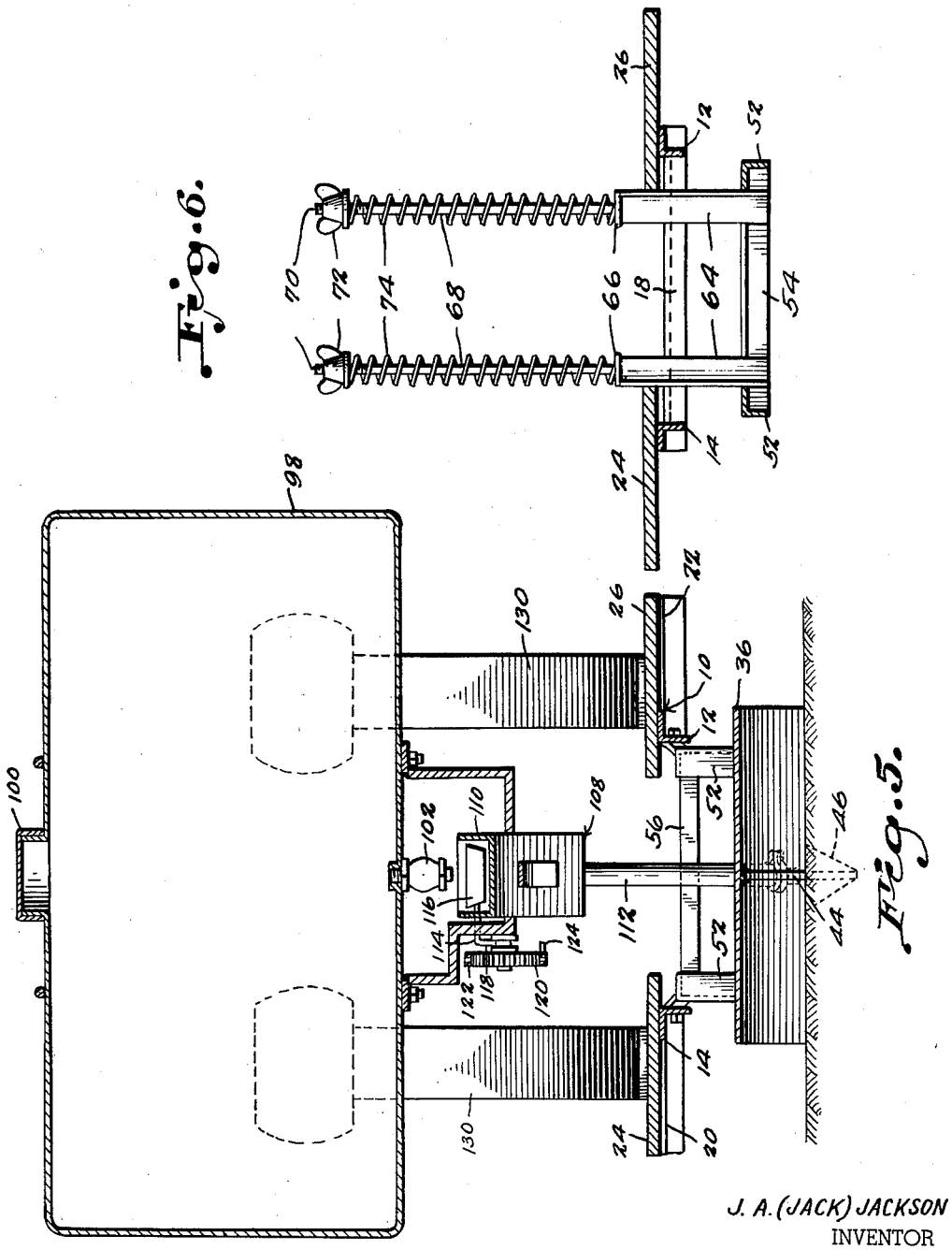

2,731,928

TRANSPLANTER

Jonas A. (Jack) Jackson, Lebanon, Tenn.

Application November 14, 1951, Serial No. 256,223

2 Claims. (Cl. 111—7)

This invention relates to a transplanter and more particularly to a transplanter of the type which is adapted to be connected to and carried by a conventional farm tractor.

The primary object of the invention is to provide means to discharge a measured volume of water into a furrow about a set plant after the furrow has been opened but prior to the closing thereof.

The above and other objects may be attained by employing this invention which embodies among its features an elongated frame, furrow opening means carried by the frame intermediate the ends thereof and furrow closing means carried by the frame adjacent the furrow opening means, and means for supplying water to a furrow between the furrow opening means and the furrow closing means.

Other features include a ground wheel carried by the frame adjacent the furrow opening means, a tank carried by the frame above the ground wheel, a duct carried by the frame and having its inlet end disposed adjacent the tank and its outlet end adjacent the furrow opening means and in advance of the furrow closing means, and means within the duct and operatively connected to the ground wheel for periodically discharging water discharged from the tank into the duct and said last named means being operatively connected to the ground wheel.

In the drawings,

Fig. 1 is a side view of a transplanter embodying the features of this invention, Fig. 2 is a view from the opposite side of the transplanter, Fig. 3 is a top plan view of the transplanter, Fig. 4 is a longitudinal sectional view through the transplanter, Fig. 5 is a transverse sectional view taken substantially along the line 5—5 of Fig. 1, and Fig. 6 is a transverse sectional view taken substantially along the line 6—6 of Fig. 1.

Referring to the drawings in detail a bed frame designated generally 10 comprises spaced parallel side bars 12 and 14 connected by transversely extending end bars 16 and 18. The end bar 18 extends beyond opposite sides of the side bars 12 and 14 and carried by the side bars 12 and 14 substantially midway between opposite ends of the frame 10 are laterally extending arms 20 and 22 which form supports for the forward ends of planks 24 and 26, the rear ends of which rest on and are secured to the lateral extensions of the bar 18.

Carried by and extending upwardly from the end bar 16 adjacent opposite side bars 12 and 14 are plates 28 carrying hook shaped bolts 30 by means of which the device is coupled to the power lift (not shown) of a conventional farm tractor.

Welded or otherwise secured to the side bars 12 and 14 intermediate the ends of the planks 24 and 26 and extending downwardly and forwardly from the side bars are legs 32 and 34, the lower ends of which are attached to a transversely extending plate 36 which extends upwardly and forwardly from the lower ends of the legs 32 and 34 and has its forward upper edge secured to brackets 38 and 40 which depend from and are attached to the side bars 12 and 14 adjacent the forward ends of the planks 24 and 26. The lower rear edge of the plate 36 is provided intermediate opposite ends with a notch 42 (Fig. 4) and carried by the plate 36 and depending from the under side thereof is a substantially V-shaped furrow opener 44 carrying adjacent its rear end divergent wings 46 which enter the surface of the ground to push the soil loosened by the furrow opener to opposite sides of the furrow.

Extending transversely across the frame 10 and carried by the side bars 12 and 14 is a pivot bar 48 upon which is mounted for movement in a vertical arcuate path a sub frame designated generally 50. This sub frame comprises spaced parallel side bars 52 which are held in spaced parallel relation at their rear ends by a transversely extending end bar 54 and adjacent their forward ends by a transversely extending bar 56 and carried by the side bars 52 of the sub frame 50 intermeidate the ends thereof are depending brackets 58 carrying packer wheels 60 which converge as they recede from the frame 50 to engage the earth deposited on opposite sides of the furrow and pack it about plants which have been set in the furrow. Suitable scrapers 62 are carried by the side bars 52 of the sub frame 50 and engage the peripheries of the packer wheels 60 to scrape earth which may adhere thereto from the surface thereof. Carried by the end bar 54 of the sub frame 50 and extending upwardly therefrom are spaced arms 64 carrying at their upper ends laterally extending plates 66 which are pierced to receive elongated rods 68 carried by the bar 18 and extending upwardly therefrom. The ends of the bars 68 remote from the cross bar 18 are externally screw threaded as at 70 to receive wing nuts 72 which bear on the upper ends of compression coil springs 74, the lower ends of which engage the plates 66 to yieldingly urge the sub frame 50 downwardly with relation to the bed frame 10.

Carried by the side bars 12 and 14 adjacent the forward ends thereof are bearing brackets 76 in which is mounted to rotate a transversely extending jack shaft 78. A sub frame designated generally 80 is mounted on the jack shaft to move in a vertical arcuate path and comprises spaced parallel side bars 82 carrying at their ends remote from the jack shaft a shaft 84. Mounted on the shaft 84 between the parallel side bars 82 of the sub frame 80 is a ground wheel 86, and carried on the shaft 84 to one side of the sub frame 80 is a sprocket 88 which is adapted to rotate with the shaft 84 which in turn is rotated by the ground wheel 86. A sprocket 90 is connected to the jack shaft 78 for rotation therewith and trained about the sprockets 88 and 90 is an endless chain 92 by means of which driving connection is established between the ground wheel 86 and the jack shaft 78. A sprocket 94 is carried by the jack shaft 78 adjacent the end thereof remote from the sprocket 90 for a purpose to be more fully hereinafter explained.

Carried by the side bars 12 and 14 intermediate the planks 24 and 26 and the transversely extending end bar 16 are upwardly extending legs 96 which support at their upper ends a water tank 98 which is equipped in its top with a suitable filling opening to be closed by a cap 100. Carried by the water tank above the plate 36 is a downwardly opening valve 102 having a valve handle 104 which is disposed toward the rear end of the device to be readily accessible to occupants of the planks 24 and 26. Carried by the water tank and extending beneath the valve 102 is an open ended plant carrying tray 106 from which the occupants of the planks 24 and 26 may extract plants and insert them in a furrow between the furrow opener 44 and the packer wheels 60. Mounted beneath the tank 98 and extending into the trough 106 is a duct designated generally 108 which comprises a relatively large chamber 110 located directly below the lower end of the valve 102 and a flexible hose 112 which opens into the chamber 110 adjacent the lower end thereof and has its lower end disposed directly above the notch 42 in the plate 36. Extending through opposite side walls of the chamber 110 is a rock shaft 114 to which is fixed within the chamber a cup 116 having its open upper end disposed directly beneath the valve 102, and carried by the rock shaft 114 on the outside of the chamber 110 is a laterally extending arm 118. A retractile coiled spring 119 is connected at one end to the arm 118 and at its opposite end to the tray 106 to yieldingly hold the cup 116 in an upright position beneath the valve 102. Mounted for rotation on the plant supporting trough 106 adjacent the arm 118 is a sprocket 120 and trained over this sprocket and the sprocket 94 on the jack shaft 78 is an endless chain 122 carrying laterally extending lugs 124 which move in a closed path which intersects the arm 118 so that as the chain 122 is moved by the sprocket 94, the arm 118 will be engaged by a lug 124 to cause the rock shaft 114 to rock about its horizontal axis and tilt the cup 116 so as to discharge the contents thereof into the chamber 110.

In the preferred form of the invention the sub frame 80 carries on one side thereof a chain tightener 126 which engages the chain 92 and is adjustable to maintain the chain 92 under the desired tension. A second adjustable chain tightener 126 is carried adjacent the forward end of the water tank 98 for engagement with the chain 122. In the preferred form of the invention suitable back rests 130 are carried by the planks 24 and 26 against which the occupants of the planks may rest while the machine is in operation.

Carried by the brackets 76 and extending rearwardly therefrom is an arm 132 carrying an upwardly and rearwardly extending stud 134, the upper end of which is provided with external screw threads 136 for engagement with internal screw threads of a wing nut 138. This stud 134 extends through a transversely extending plate 140 connected across side bars 82, and extending between the nut 138 and the plate 140 is a compression coil spring 142 by means of which the sub frame 80 and consequently the ground wheel 86 is urged downwardly with relation to the bed frame 10. It will thus be seen that the weight of the bed frame 10, water tank 98, occupants of the planks 24 and 26 and the other equipment carried by the bed frame 10 is suspended on the springs 74 and 142 when the device is in operation so as to press the ground wheel 86, the furrow opener and plate 36 and the packer wheels 60 into engagement with the surface being traversed to assure proper operation of the device while at the same time owing to the yielding connections between the sub frames 50 and 80 slight differences in the elevations of the ground will be compensated for without materially affecting the operation of the furrow opener and the packer wheels.

In operation the persons who are to do the transplanting occupy the planks 24 and 26 on opposite sides of the plant carrying trough 106. As the transplanter progresses, the ground wheel 86 will rotate and substantially the entire weight of the bed frame 10 will be transferred through the arms 32 and 34 to the plate 36 so that the latter drags on the ground thus forcing the furrow opener 44 to break the surface of the ground at a point accessible to the occupants of the planks 24 and 26 so that plants may be transferred from the tray or trough 106 to the freshly opened furrow. Owing to the rotation of the wheel 86, it will be evident that the chain 122 through the medium of the jack shaft 78 will be driven in its closed path to cause the lugs 124 to periodically engage the arm 118 and tilt the cup 116 within the chamber 110. With the valve 102 adjusted to deliver a desired quantity of liquid from the tank 98 into the cup, it will be obvious that the tilting of the cup will discharge the liquid into the chamber 110 from which it finds its way through the hose 112 to the discharge end thereof so that the liquid is periodically deposited in the freshly opened furrow and consequently the plants inserted therein will be irrigated. Immediately after the insertion of the plants and the irrigation thereof, the packer wheels 60 move along opposite sides of the plants to pack the earth around them and any earth adhering to the peripheries of the packer wheels will be scraped therefrom by the scrapers 62. By attaching the device to the power lift of a conventional farm tractor, it is obvious that the transplanter arm may be elevated for transportation and while turning at the end of a field thus facilitating the maneuvering of the device.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. A transplanter comprising an elongated frame, means carried by the frame intermediate the ends thereof for opening a furrow in the ground beneath the frame, furrow closing means carried by the frame behind the means for opening the furrow, a ground wheel carried by the frame in advance of the means for opening the furrow, a water tank carried by the frame above the ground wheel, a water receiver carried by the tank above the means for opening the furrow, a water discharge pipe carried by and opening into the water receiver, the pipe having a discharge opening between the means for opening the furrow and the furrow closing means, a shaft mounted in the water receiver for rocking movement about a horizontal axis, a cap fixed to said shaft for rocking movement therewith, a lever arm carried by said shaft at one side of the water receiver, a spring connected at one end to a part fixed to the water tank and connected at its other end to the lever arm holding the cup upright, a valve carried by the water tank above the cup and communicating with the water tank for regulating the flow of water from the tank into the cup, and means driven by the ground wheel and periodically engaging the lever arm for moving said lever against the effort of the spring and tilting the cup.

2. The structure defined in claim 1 in which the means connected to the ground wheel and periodically engaging the lever arm comprises a jack shaft mounted on the frame to rotate about an axis which lies transversely thereof, an endless chain establishing driving connection between the ground wheel and the jack shaft, an endless chain connected to the jack shaft and movable thereby in a closed path which engages the lever arm and spaced lugs carried by the last mentioned chain for engaging the lever arm and tilting the cup against the effort of the spring.

References Cited in the file of this patent

UNITED STATES PATENTS

| | | |
|---|---|---|
| 345,184 | Smith | July 6, 1886 |
| 1,106,405 | Poucher | Aug. 11, 1914 |
| 1,721,866 | Junge | July 23, 1929 |
| 1,802,273 | Richards et al. | Apr. 21, 1931 |
| 1,806,622 | Gibbens | May 26, 1931 |
| 1,807,474 | England | May 26, 1931 |
| 2,230,643 | Hershey | Feb. 4, 1941 |
| 2,475,078 | Cherry | July 5, 1949 |
| 2,506,430 | Melvin | May 2, 1950 |
| 2,584,012 | Griffin | Jan. 29, 1952 |

FOREIGN PATENTS

| | | |
|---|---|---|
| 34,560 | France | Feb. 19, 1929 |
| | (Addition to No. 634,451) | |